United States Patent [19]
Wigner et al.
[11] 3,808,367
[45] Apr. 30, 1974

[54] METHOD AND CIRCUIT FOR TIMING SIGNAL DERIVATION FROM RECEIVED DATA

[75] Inventors: William K. Wigner, Kissimmee; Albert S. Sabin, Jr., Orlando, both of Fla.

[73] Assignee: Martin Marietta Corporation, Orlando, Fla.

[22] Filed: Apr. 19, 1972

[21] Appl. No.: 245,565

Related U.S. Application Data

[63] Continuation-in-part of Ser. No. 191,726, Oct. 26, 1971.

[52] U.S. Cl. .......... 178/69.5 R
[51] Int. Cl. .......... H04l 7/00
[58] Field of Search ..... 178/69.5 R, 69.5 G, 69.5 F; 328/63; 179/15 BS

[56] References Cited

UNITED STATES PATENTS

| | | | |
|---|---|---|---|
| 3,544,717 | 12/1970 | Smith | 178/69.5 A |
| 3,585,298 | 6/1971 | Liberman | 178/69.5 R |
| 3,668,315 | 6/1972 | Heitzman | 178/69.5 R |
| 3,440,547 | 4/1969 | Houcke | 178/69.5 R |

*Primary Examiner*—Richard Murray
*Attorney, Agent, or Firm*—Burns. Doane, Swecker & Mathis

[57] ABSTRACT

A method and circuit for deriving timing signals from received data through the detection of a predetermined digital code in the received data, the modification of the synchronization response rate in response to the detected code and the instantaneous control of timing signal phase in response to the detected code and its complement. A locally generated clock signal is rapidly synchronized at a first response rate until the code is detected. Thereafter, the clock signal synchronization is maintained at a second response rate lower than the first rate to provide a high degree of stability. A means is provided to retain clock signal synchronization during received outages.

21 Claims, 8 Drawing Figures

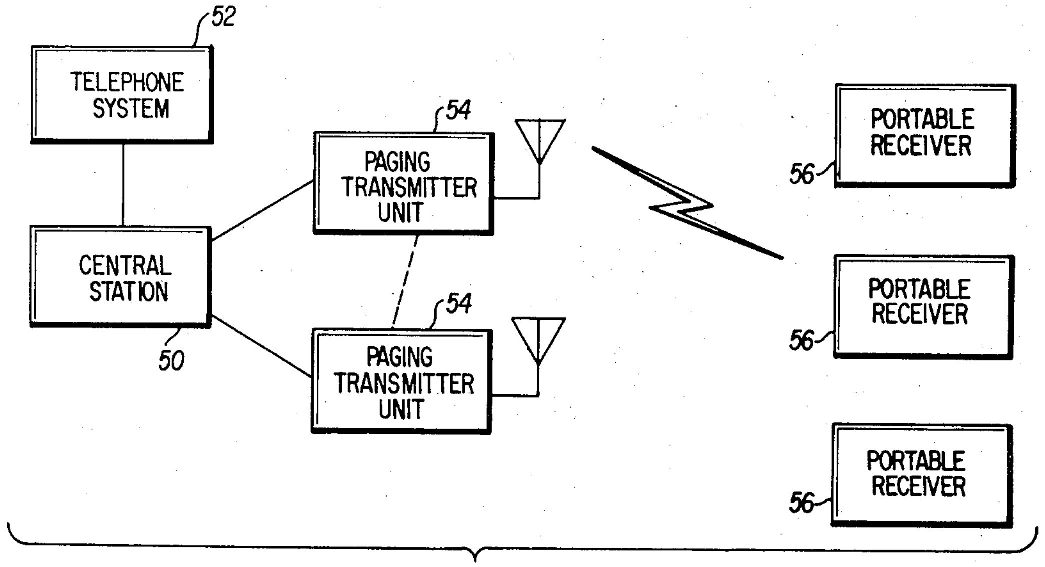
FIG. 1 SYSTEM
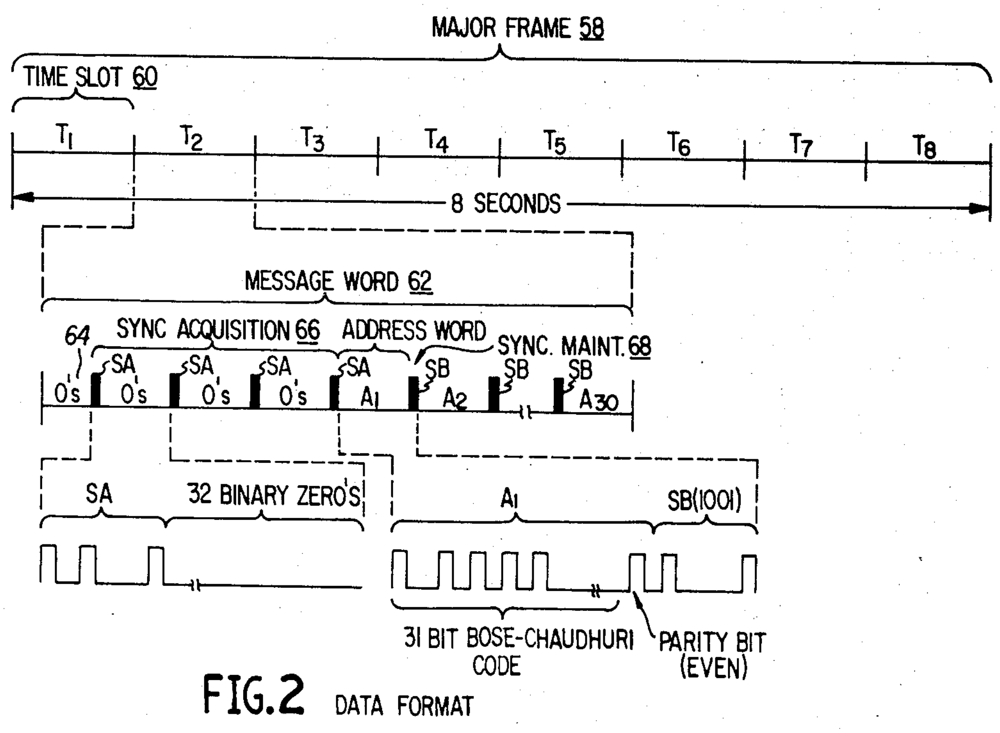
FIG. 2 DATA FORMAT

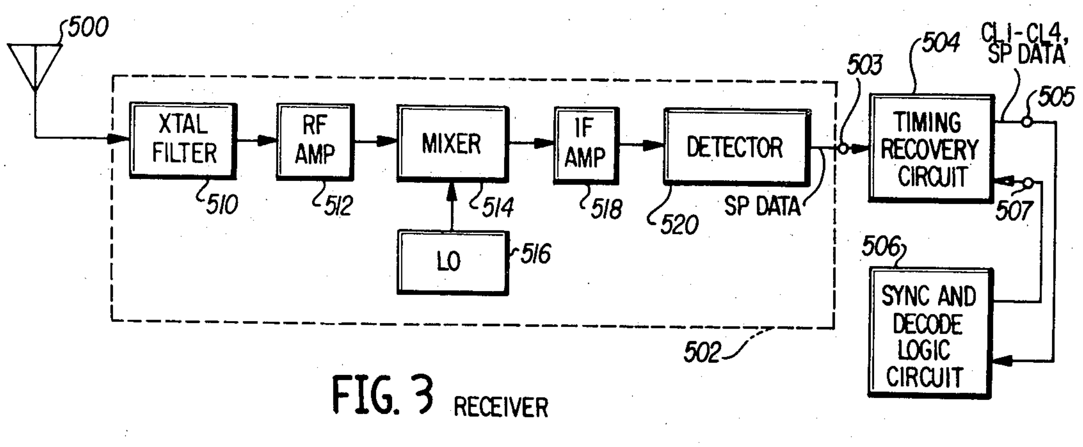
FIG. 3 RECEIVER
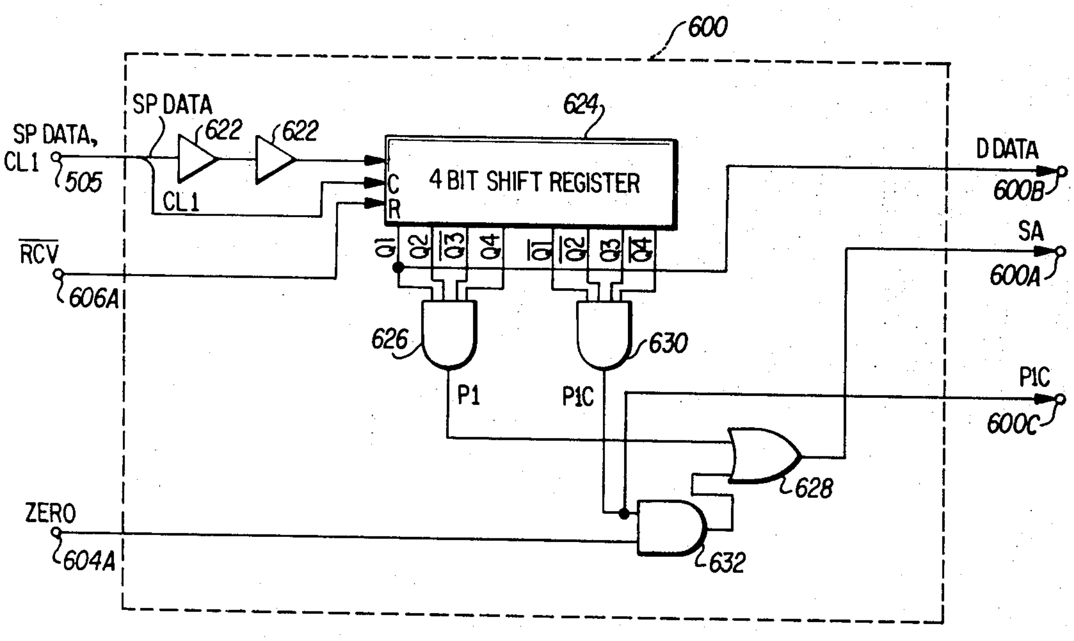
FIG. 6 SYNC PATTERN DETECTOR

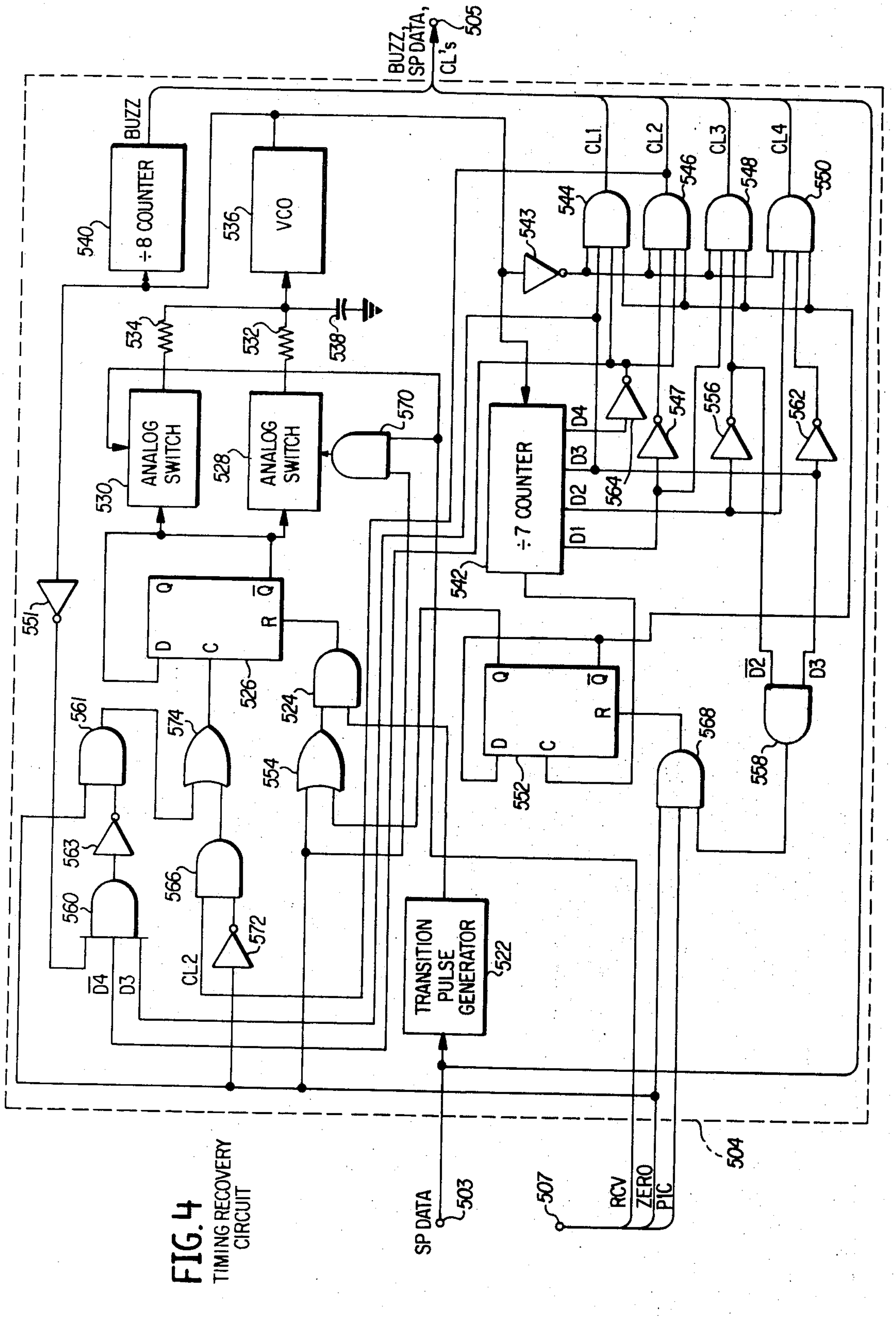
FIG. 4 TIMING RECOVERY CIRCUIT

METHOD AND CIRCUIT FOR TIMING SIGNAL DERIVATION FROM RECEIVED DATA

This application is a continuation-in-part of copending application Ser. No. 191,726 filed October 26, 1971, by William K. Wigner and Albert S. Sabin, Jr. for "Receiver Method and Apparatus" and assigned to the assignee of the present invention.

BACKGROUND OF THE INVENTION

The present invention relates to a method and apparatus for data transmission and control, and particularly to a method and apparatus for deriving timing signals from a digital data stream whereby the timing signals may be utilized to decode the received data stream. While the applications for the method and apparatus of the present invention are legion both for data transmission and for control, particular utility has been found in the environment of a subscriber paging service and the invention will hereinafter be described in that environment for illustrative purposes.

For example, known paging systems generally involve the selective transmission of subscriber identifying signals via electromagnetic wave energy at line-of-sight frequencies from a plurality of transmitters spaced throughout the paging area. Each of these subscribers is conveniently provided with a portable receiver which provides an audible indication upon the reception and decoding of the assigned subscriber identifying signal.

In the related Wigner et al., application, a data receiver particularly suited for a paging system is disclosed and claimed. In such a data receiver, data is received and evaluated in accordance with positions of of the binary signal level "bits" in a serial data or bit stream. To provide this evaluation, a clock signal is generated and is utilized as a timing signal to determine the level of each data bit at particular positions in the data stream. Both the frequency and phase of the clock signal must be nearly matched, respectively, in frequency and phase to the incoming data or bit stream for proper decoding.

The frequency and phase tolerances required to maximize evaluation of the bit stream are such that it is necessary to use a highly accurate oscillator to generate the clock signal, particularly if the data signal has a high repetition or bit rate. However, the use of devices such as crystal controlled or voltage controlled oscillators having the necessary accuracy presents numerous problems. For example, the use of a crystal controlled oscillator to provide the desired phase and frequency relationships between the incoming data signal and the locally generated clock signal may require large, complex timing circuits which consume a large amount of power in operation. Moreover, the length of time required to synchronize a crystal controlled oscillator with the incoming data signal after the oscillator is energized may be prohibitive. In addition to the time required for the oscillator to stabilize after turn-on, a considerable portion of the incoming data stream may be required for synchronization purposes thereby resulting in a decreased data transmission rate.

These problems may be particularly acute should a crystal controlled oscillator be utilized in a system of the type requiring low power consumption and rapid synchronization, e.g., the paging receiver described in the referenced Wigner et al., application. In the receiving system of the Wigner et al. application, for example, the receiver is energized and deenergized intermittently during normal operation. In addition, the receiver must be extremely small, lightweight and capable of being powered for long periods of time by the battery power supply contained therewith.

Available circuits utilizing crystal controlled oscillators and performing the desired bit synchronization function are generally wide band devices designed primarily for fast synchronization. Such rapid acquisition of synchronization is, however, in conflict with the requirement for high accuracy and stable performance after acquisition has been attained. Consequently, available circuits are highly susceptible to erroneous synchronization in response to noise and are also highly susceptible to loss of synchronization due to missing bits or noise in the incoming data stream. Quite understandably, many of the available devices are thus unacceptable for use in a system in which some errors in the received data signal are tolerated in evaluating the data represented by this signal.

Because of the above and other significant problems such as high cost associated with the use of crystal controlled oscillators where accurate frequency and phase relationships are required, it may be preferable to utilize a voltage controlled oscillator (VCO) to generate a local clock signal and the use of such a device will be described herein.

Another problem experienced in generating a clock signal related in phase and frequency to the incoming data signal when fast acquisition is desired, is the possibility that the clock signal may be exactly 180° out of phase with the incoming signal. If this occurs, the evaluation of the incoming data signal is completely erroneous since the data signal evaluated is the complement of the actual signal of which an evaluation is desired.

The data receiver may, of course, be designed to evaluate either the data signal or its complement in which event the evaluation circuit necessarily becomes more complex. Moreover, the amount of data which can be transmitted with a predetermined number of data bits is considerably reduced.

It is accordingly an object of the present invention to provide a novel method and apparatus for generating a synchronized clock signal, which method and apparatus obviates these and other problems associated with known prior clock signal generators.

It is another object of the present invention to provide a novel method and apparatus for synchronizing a clock signal with an incoming data signal.

It is a further object of the present invention to provide a novel method and apparatus for rapidly synchronizing a clock signal with an incoming data signal and thereafter maintaining synchronization with great stability.

It is yet another object of the present invention to provide a novel method and apparatus for synchronizing a clock signal to an incoming data signal wherein 180° phase ambiguity may be rapidly eliminated.

It is still another object of the present invention to provide a novel method and apparatus for synchronizing a clock signal to an incoming data signal wherein a predetermined number of bit errors in the incoming data signal may be tolerated without loss of synchronization.

It is still a further object of the present invention to provide a novel method and apparatus for generating a local clock signal in response to an incoming digital data stream wherein the clock signal is rapidly synchronized in phase and frequency to the phase and frequency of the bits in the data stream whereby the clock signal may be utilized to evaluate the data stream with little loss of data transmission rate.

Yet a further object of the present invention is to provide a novel method and apparatus for acquiring synchronization with a received data signal at twice the modulation bit rate.

Yet still a further object of the present invention is to provide a novel method and apparatus for recognizing a digital synchronization word in a data signal despite a phase difference of 180° between the data signal and the reference clock.

Yet another object of the present invention is to provide a novel method and apparatus for dual mode operation of a voltage controlled oscillator and phase locked loop whereby stability is sacrificed for speed in the acquisition mode and stability thereafter increased in the maintenance mode.

These and other objects and advantages of the present invention will become apparent to one skilled in the art from the claims and from a perusal of the following detailed description when read in conjunction with the attached drawings in which:

THE DRAWINGS

FIG. 1 is a general functional block diagram of a basic embodiment of an exemplary paging system with which the present invention may be utilized;

FIG. 2 is a timing diagram illustrating the data format;

FIG. 3 is a functional block diagram of one of the portable receivers of FIG. 1;

FIG. 4 is a functional block diagram of an embodiment of the timing recovery circuit of FIG. 3 particularly suited for use in the paging system of FIG. 1;

FIG. 6 is a functional block diagram of the sync pattern detector of FIG. 5;

Figure 7:
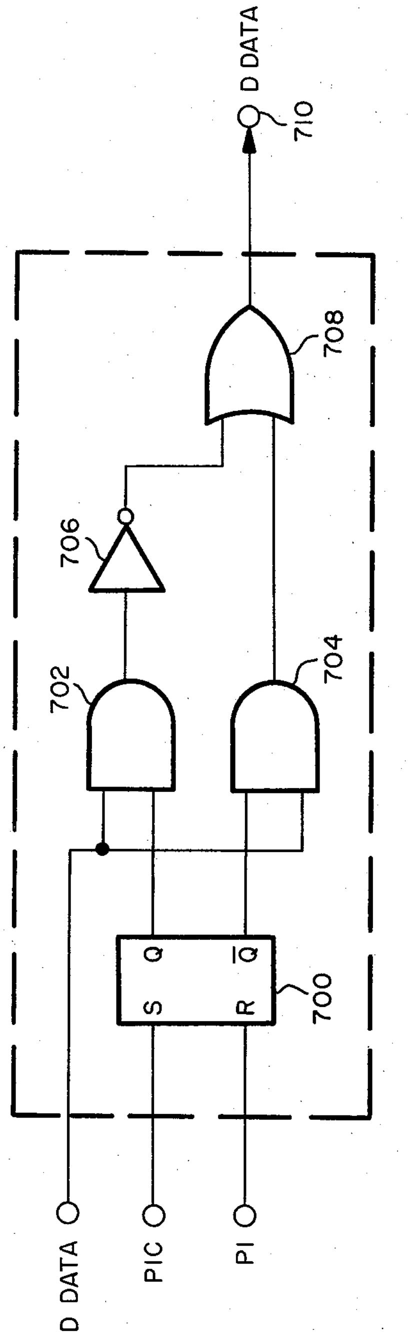
Figure 8:
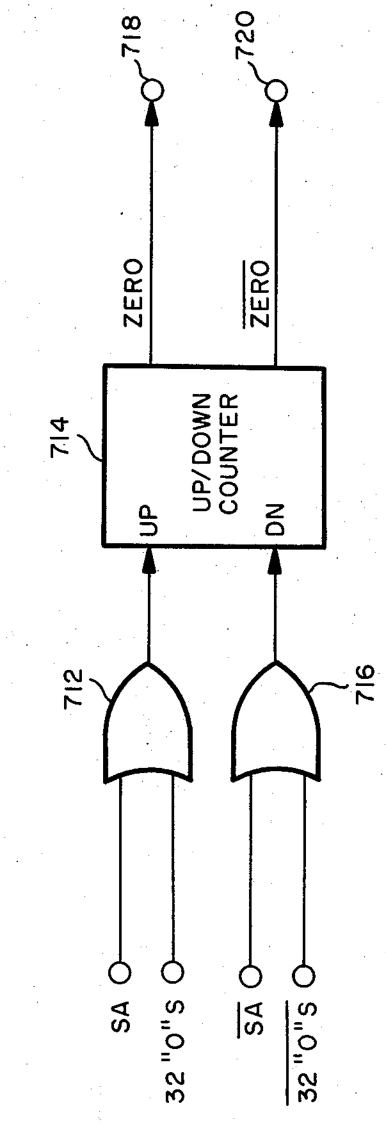

FIG. 7 is a functional block diagram illustrating a circuit modification which may be utilized in conjunction with the timing recovery circuit of FIG. 3 to eliminate a 180° out-of-phase condition; and, FIG. 8 is a functional block diagram illustrating an up/down counter circuit which may be utilized in conjunction with the present invention to allow for a predetermined bit error rate without a loss of synchronization.

BASIC SYSTEM DESCRIPTION

With reference to FIG. 1 where a basic paging system embodiment of the present invention is illustrated, the central station 50 may, where the capacity of the system so dictates, include a suitable general purpose digital computer (not shown). The central station 50 may be accessed through any suitable switching system such as the illustrated commercially installed telephone system 52 to receive subscriber designating signals via the commercially installed telephone lines and exchanges of the system 52. In response to the received subscriber designating signals, the central station 50 may generate paging signals for transmission to one or more of a plurality of transmitter units 54 spaced throughout the paging area.

The paging signals transmitted from at least one of the transmitter units 54 are received by portable receivers 56 carried by the individual system subscribers. The receipt of the address signal associated to a particular subscriber by his portable receiver 56 will provide the subscriber with an indication that a call has been received. The subscriber may thereafter determine the reason for the page by seeking a telephone and dialing a designated number to receive a message or by directly dialing the person who initiated the page if that information is known to the subscriber.

A more detailed discussion of the system of FIG. 1 and its operation may be obtained from the Wells et al. Pat. application Ser. No. 191,855 entitled "Data Transmission Method and Apparatus" assigned to the assignee of the present invention. The disclosure of said Wells et al. Pat. application Ser. No. 191,855 is hereby incorporated herein by reference.

DATA FORMAT

The data format utilized with the preferred embodiment of the paging system is illustrated in FIG. 2. As was previously described in connection with FIG. 1, the dialing party initiates subscriber designation signals for transmission to the central station 50 through the telephone system 52. These subscriber designation signals are converted to binary form and stored in a waiting queue at the central station 50 for subsequent encoding and combination with synchronizing signals to form a paging signal which may, for example, comprise a thirty subscriber address message word for repetitive transmission in a predetermined number of time slots during one major data frame. Repetition of the same message word is, of course, not required in a single transmitter system but can be effected if desired.

In the example shown in FIG. 2, each major frame 58 may comprise eight 1 second time slots 60 designated $T_1$ through $T_8$. The identical message word 62 may be transmitted during each of the eight time slots of a particular major frame from a different transmitter or group of transmitters as is described in copending Wells U.S. Pat. application Ser. No. 191,727 assigned to the assignee of the present invention. The disclosure of the Wells application Ser. No. 191,727 is hereby incorporated herein by reference.

The number of transmitter units 54 of FIG. 1 may be at least equal to the number of time slots utilized in a major frame and a particular transmitter of one of the transmitter units 54 may transmit a message word 62 during one or several of the time slots 60 in a major frame 58. The number of time slots 60 may, of course, exceed the number of transmitters in the system where expansion of the paging area is contemplated.

With continued reference to FIG. 2, each message word 62 is a serial pulse train preferably commencing with a group of 12 binary bits, e.g., 12 binary ZERO bits as indicated at 64, followed by a synchronization (sync) acquisition signal 66, and in turn, followed by 30 different addresses or address words A1–A30 which may be separated from each other by identical sync maintenance signals 68 of 4 binary bits each. The sync acquisition signal 66 preferably includes four identical four bit patterns each separated by a 32 binary bit signal, e.g. 32 binary ZEROS in the signal illustrated in FIG. 2. The four identical 4 bit sync patterns (designated SA) are coded in accordance with a predetermined binary code, e.g. 1101 as illustrated. Thus, the sync acquisition signal may be indicated as SA, O's, SA, O's, SA, O's, SA where SA designates the selected 4 bit code and O's designates the 32 binary ZERO's.

Each address word A1–A30 preferably includes a 31 bit Bose-Chaudhuri coded address designation and one parity bit. Adjacent of the 30 address words A1–A30 are separated by the sync maintenance signal 68 (designated SB) which is preferably a four bit serially coded signal which differs from the sync acquisition code SA. Thus, each message word 62 transmitted during one of the time slots $T_1$–$T_8$ comprises 1,200 binary bits.

The initial 12 binary ZERO bits indicated at 64 in FIG. 2 are not required but may be utilized to assist in bit synchronization of the receivers as will hereinafter be described. In addition, these 12 binary ZERO bits provide some time spacing between the turn on of a transmitter and the transmission of the sync acquisition signal 66 which time spacing may be desirable. The initial 12 binary bits need not, of course, be all binary ZERO's but may be any predetermined code. Simplification of the logic is, however, possible by the use of all ZERO's in the described embodiment and the use thereof may be desirable where, for example, the communications link between the central station 50 and transmitter units 54 of FIG. 1 is omnidirectional transmission of electromagnetic energy at radio frequencies.

When transmitted by the transmitter units 54 of FIG. 1, the synchronization acquisition signals illustrated in FIG. 2 may be utilized by the individual paging receivers 56 to determine the bit error rate of the paging signal prior to decoding the subsequent address words as will subsequently be described in greater detail. The 4 bit sync maintenance signal SB may be unique to the paging system operating in a particular paging area and may be utilized both to assist in determining the bit error rate and to ensure proper framing of each of the address signals. Moreover, if signals are received by a portable receiver assigned to one paging area from a paging system in an adjacent paging area, the sync maintenance signal SB assigned to the system of the adjacent area will be rejected by the receiver. The likelihood of false synchronization and possible erroneous paging of receivers by signals from the wrong system is thus significantly reduced.

As previously discussed, each of the address words A1–A30 comprises 32 bit positions. The first 31 bit positions may identify the subscriber being paged and the last bit may be inserted as a parity bit. All 32 bits may, however, be used as the subscriber address. The preferred code is a highly redundant Bose-Chaudhuri 31–16–3 code, i.e., 31 total bits are utilized to code a 16 bit message with a 7 bit (2 time 3 + 1) difference between each message. The use of this code with an even parity bit increases the bit difference between codes to a minimum of 8 bits between adjacent unique addresses while allowing the system to service over 65,500 subscribers.

In addition to the extremely high subscriber address capacity provided by the Bose-Chaudhuri 31–16–3 code, the use of this code makes the probability of accepting the correct address very high, while at the same time severely limiting the probability of accepting an address intended for another subscriber, even in very high error enviroments. For example, if 2 bit errors are tolerated in decoding an address for a particular subscriber, the probability of a receiver accepting that address is over 99·99 percent. Moreover, since only 2 bit errors are tolerated in this example in decoding an address, there are still at least 6 bit differences between the subscriber's address and any other transmitted address.

If the extremely high subscriber capacity achieved with the above described code is not required, a Bose-Chaudhuri 31–11–5 code may be utilized. The use of this code limits the number of allowable users to 2,047 but increases the number of differences between any two coded address signals to at least 12 bits, significantly reducing still further the probability of false calls. On the other hand, if still higher capacity is required, a Bose-Chaudhuri 31–21–2 code may be utilized. This code provides subscriber capacity of over 2 million with the difference between any two addresses being reduced to a minimum of 6 bits. This lower minimum bit difference of 6 tends to slightly increase the probability of a false call, but the increase is very slight when compared to the vast increase in system capacity.

Irrespective of which of the above codes is utilized, the system data format as illustrated in FIG. 2 may remain the same. Moreover, the central station does not require 31 bit capacity for storing incoming addresses and directory addresses since the highly redundant Bose-Chaudhuri encoded addresses may be readily generated from address signals having fewer than 31 bits, e.g., from a 16 bit address signal when utilizing the preferred Bose-Chaudhuri 31–16–3 code.

RECEIVER

One novel enbodiment of the portable receivers 54 illustrated in the system of FIG. 1 is illustrated in FIG. 3. Referring now to FIG. 3, the novel portable receiver 54 of the present invention generally comprises an antenna 500, an FM radio receiver 502, a timing recovery circuit 504 and a sync and decode logic circuit 506.

The antenna 500 may be any suitable conventional antenna which preferably takes up little space in the receiver housing. For example, the antenna 500 may comprise a conventional ferrite antenna suitable for operation at the desired radio wavelengths.

The FM radio receiver 502 may likewise be any suitable conventional, preferably miniaturized, FM radio receiver for receiving the radio frequency paging signal detected by the antenna 500 and for detecting the modulation of the radio frequency signal carrier.

The radio paging signal detected by the antenna 500 may be applied to a suitable conventional crystal bandpass filter 510 tuned to the center frequency at which the radio paging signals are transmitted. The output signal from the crystal filter 510 may be amplified by a suitable conventional radio frequency amplifier 512 and applied to a suitable conventional mixer 514. The output signal from a conventional local oscillator 516 may be applied to the mixer 514 and the intermediate frequency (IF) output signal from the mixer 514 may be amplified through a conventional IF amplifier 518 and applied to a suitable conventional FM detector or discriminator 520.

A SPDATA output signal from the detector 520 may then be applied to the timing and data recovery circuit 504 via an input terminal 503 and the output signals from the timing and data recovery circuit 504 may be applied to the sync and decode logic circuit 506 via a collective output terminal 505. A plurality of signals from the sync and decode logic circuit 506 may be applied to the timing and data recovery circuit 504 via a collective terminal 507 as is explained in detail in the previously referenced Wigner et al. application Ser. No. 191,726.

The FM radio receiver 502 operates in a conventional manner to detect changes in the frequency of the detected radio signals within the desired frequency band with respect to a predetermined center frequency. Since, in the preferred embodiment of the present invention, the paging signals are transmitted as frequency shift keyed signals, the output signal from the detector 520 of the FM radio receiver 502 comprises a plurality of pulses which change in signal level each time a shift in the frequency of the input signal applied to the detector 520 is sensed. These output pulses are preferably in the form of conventional split phase signals and comprise the SPDATA signal applied to the output terminal 503.

The timing and data recovery circuit 504 converts the SPDATA signal from the detector 520 into a conventional non-return to zero (NRZ) digital format and recovers timing signals therefrom. This NRZDATA signal and the generated timing signals are then applied to the sync and decode logic circuit 506 for evaluation as is described in detail in the referenced Wigner et al. application Ser. No. 191,726.

Timing Recovery Circuit

The timing recovery circuit 504 of FIG. 3 is illustrated in greater detail in the functional block diagram of FIG. 4. Referring to FIG. 4, the split phase data signal SPDATA from the output terminal 503 of the detector 520 of FIG. 3 may be applied to a suitable conventional transition pulse generator 522 in the timing and data recovery circuit 504 The output signal from the transition pulse generator 522 may be applied to one input terminal of a two input terminal AND gate 524 and the output signal from the AND gate 524 may be applied to the reset input terminal R of a conventional bistable multivibrator or flip-flop 526.

The false or $\overline{Q}$ output terminal of the flip-flop 526 may be connected to the set steering input terminal D of the flip-flop 526 and to the analog data input terminals of first and second analog switches 528 and 530. The output signals from the analog switches 528 and 530 may be applied, respectively, through resistors 532 and 534 to the control input terminal of a conventional voltage controlled oscillator (VCO) 536. The control input terminal of the oscillator 536 may be grounded through a capacitor 538.

The output signal from the VCO 536 may be applied to a divide by 8 counter 540, to a divide by 7 counter 542, through an inverter 543 to one input terminal of each of a plurality of 4 input terminal AND gates 544–550, and through an inverter 551 to one input terminal of a 3 input terminal AND gate 560.

The output signal from the counter 542 may be applied to the clock input terminal C of a conventional bistable multivibrator or flip-flop 552 and the false output terminal $\overline{Q}$ of the flip-flop 552 connected to the set steering input terminal D thereof. The output signal from the false output terminal $\overline{Q}$ of the flip-flop 552 may be applied to one input terminal of each of the AND gates 544–550 and the output signal from the true output terminal Q of the flip-flop 552 may be applied to one input terminal of a two input terminal OR gate 554. The output signal from the OR gate 554 may be applied to the other input terminal of the AND gate 524.

The D1 output signal from the first stage of the counter 542 may be applied to one input terminal of the AND gate 548 and through an inverter 547 to one input terminal of the AND gate 546. The D2 signal from the second stage of the counter 542 may be applied to one input terminal of the AND gate 550, through an inverter 556 to one input terminal of the AND gate 548, and to one input terminal of a two input terminal AND gate 558.

The D3 output signal from the counter 542 may be applied to the other input terminal of the AND gate 558, to one input terminal of the AND gate 544, to one input terminal of the three input terminal AND gate 560 and through an inverter 562 to one input terminal of the AND gate 550. The D4 output signal from the counter 542 may be applied through an inverter 564 to one input terminal of each of the AND gates 544, 546, and 560.

The CL1–CL4 clock output signals from the AND gates 544–550, respectively, may be applied to the collective output terminal 505 together with the SPDATA signal from the detector 520 of FIG. 3 and the output signal BUZZ from the divide by eight counter 540. In addition, the CL2 clock signal from the AND gate 546 may be applied to one input terminal of a two input terminal AND gate 566.

With continued reference to FIG. 4, the ZERO signal from the collective terminal 507 of the sync and decode logic circuit 506 of FIG. 3 may be applied to one input terminal of a three input terminal AND gate 568, to the other input terminal of the OR gate 554, to one input terminal of a two input terminal AND gate 570, to one input terminal of a two input terminal AND gate 561, and through an inverter 572 to the other input terminal of the AND gate 566. The output signal from the AND gate 560 may be applied through an inverter 563 to the other input terminal of the AND gate 561 and the output signal from the AND gate 561 may be applied to one input terminal of a two input terminal OR gate 574. The output signal from the AND gate 566 may be applied to the other input terminal of the OR gate 574 and the output signal from the OR gate 574 may be applied to the clock input terminal C of the flip-flop 526.

A RCV signal is applied to the collective input terminal 507 of the timing recovery circuit 504 of FIG. 4 from the sync and decode logic circuit 506 of FIG. 3 may be applied to the other input terminal of the AND gate 570 and to the gate input terminal of the analog switch 530. The output signal from the AND gate 570 may be applied to the gate input terminal of the analog switch 528.

A P1C signal is also applied to the collective input terminal 507 from the sync and decode logic circuit 506 of FIG. 3 and may be applied to an input terminal of the AND gate 568. The output signal from the AND gate 558 may be applied to another input terminal of the AND gate 568. The output signal from the AND gate 568 may be applied to the reset input terminal R of the flip-flop 552.

In operation, the split phase data signal SPDATA detected by the detector 520 of the radio receiver 502 of FIG. 3 may be applied to the transition pulse generator 522 of FIG. 4 to generate an output pulse each time the SPDATA signal changes signal level.

The pulses from the transition pulse generator 522 thus have a repetition rate approximately twice the bit rate of the data applied thereto and, since the bit rate of the split phase data is about 1,200 bits per second, the repetition rate of the signal from the transition pulse generator 522 is approximately 2,400 bits per second. It should be noted, however, that while the frequency of the signal from the transition pulse generator 522 will be approximately 2,400 pulses per second, some pulses will be missing since the SPDATA signal is in the form of non-return to zero data.

The output signal from the voltage controlled oscillator 536 must by synchronized in phase with the incoming split phase data signal to insure the generation of clock signals CL1–CL4 synchronized in phase and bit rate with the incoming SPDATA signal. To insure proper synchronization of the voltage controlled oscillator 536, a phase-lock loop may be utilized to generate a signal related to the phase difference between the incoming SPDATA signal and the clock signals for controlling the VCO 536 as is hereinafter described in greater detail.

The output signal from the transition pulse generator 522 is gated through the AND gate 524 and applied to the reset input terminal R of the flip-flop 526 to reset the flip-flop each time the SPDATA signal changes signal level. Since it is desirable to rapidly lock the voltage controlled oscillator 536 in phase with the incoming data signal during the twelve dummy bits at the beginning of each message word, all of the transition pulses are initially gated through the AND gate 524 by the high signal level ZERO signal from the word synchronizer of the sync and decode logic circuit 506 as described in detail in the referenced Wigner et al. application. In addition, during this initial 12 bit period and until the ZERO signal from the sync and decode logic circuit 506 assumes as low signal level, both of the analog switches 528 and 530 of FIG. 4 are enabled.

With continued reference to FIG. 4, the phase detect flip-flop 526 is clocked during this initial rapid synchronization period by the output signal from the voltage controlled oscillator 536 and is reset by the transition pulses from the pulse generator 522. The output signal from the false or $\overline{Q}$ output terminal of the flip-flop 526 is applied through the enabled analog switches 528 and 530 to the integrator comprising the resistors 532 and 534 and the capacitor 538. The voltage developed across the capacitor 538 controls the output signal from the VCO 536, synchronizing this output signal in phase with the SPDATA signal at a frequency of about 16.8 kilohertz.

Since the phase information supplied to the phase detect flip-flop 526 is at a 2.4 kilohertz rate during the period when the ZERO signal is at a high signal level and since the RC time constant of the integrator circuit is quite small resulting in an increased phase lock loop bandwidth, the voltage controlled oscillator rapidly synchronizes to the incoming SPDATA signal. However, there is still a possible phase ambiguity of plus or minus 180° which must be resolved since the output signal from the transition pulse generator 522 does not differentitate between positive going and negative going transitions.

To determine the proper phasing of the clock signals, the output signal from the VCO 536 is applied to the divide by seven counter 542 and the 2.4 kilohertz output signal therefrom may be utilized to clock the phase select flip-flop 552. When the flip-flop 552 is clocked at the 2.4 kilohertz rate, the output signal from the true output terminal Q thereof controls the gating of the transition pulses through the AND gate 524 and may be either in phase or out of phase with the incoming split phase data. As long as the sync acquisition pattern SA of the incoming message word of the SPDATA signal is successfully recognized, the phase of the output signal from the phase select flip-flop 552 is not changed. However, should the complement (i.e. 0010 of the illustrative sync acquisition pattern 1101 of FIG. 3) be recognized, the "sync pattern complement" or P1C signal assumes a high signal level and the flip-flop 552 is reset at the proper time by the $\overline{D2}$ and D3 signals from the divide by 7 counter 542. The phase of the output signal from the flip-flop 552 is thus reversed.

Upon recognition of the sync acquisition pattern SA or its complement by the sync and decode logic circuit 506 described in the referenced Wigner et al application, the ZERO signal assumes a low signal level inhibiting the AND gates 561, 568 and 570 and enabling the AND gate 566. Thereafter, the CL2 signal clocks the flip-flop 526. The flip-flop 526 is thus reset on every other transition pulse selected by the phase select flip-flop 552. In addition, the analog switch 528 is inhibited and the RC time constant of the integrator circuit is substantially increased, thereby decreasing the bandwidth of the phase-lock loop.

The divide by seven counter 542 provides four output signals D1–D4 from the true output terminals of the first through fourth stages thereof, respectively. These signals are decoded by the AND gates 544–550 to provide the four clock signals CL1–CL4. The clock signals CL1–CL4 are generated at a 1,200 kilohertz repetition rate and are shifted slightly in phase relative to each other so as to provide 4 clock signals synchronized in repetition rate with the bit rate of the incoming data stream and slightly delayed relative to each other. For example, the CL1 clock signal is phased relative to the incoming data stream so that a CL1 pulse occurs in the first quarter of each bit position of the incoming SPDATA signal. The CL2–CL4 signals may be all delayed by a predetermined amount such as 50 to 100 microseconds relative to the CL1 signal and relative to each other in accordance, for example, with the order of the numerical designations thereof.

As is described in the referenced Wigner et al. application, the receiver may turn on during only one of the time slots which make up a major data frame. For example, the receiver may be energized for about 1 second and deenergized for about 7 seconds during each 8 second major data frame. During the "off" time of the receiver, the RCV signal assumes a low signal level and both analog gates 528 and 530 are inhibited. However, the capacitor 538 retains (stores) the voltage developed thereacross during the "on" time of the receiver and, when the receiver is again energized, the VCO 536 is locked approximately in phase with the incoming SPDATA signal thereby facilitating the synchronization of the timing recovery circuit. Also, since the frequency of the VCO 536 is held nearly constant during the time that the receiver is off, the "off" time of the receiver can be timed with great accuracy thus permitting the receiver reenergization for receipt of the data signal in the desired time slot of the next major data frame.

SYNCHRONIZING CIRCUIT

Figure 5:
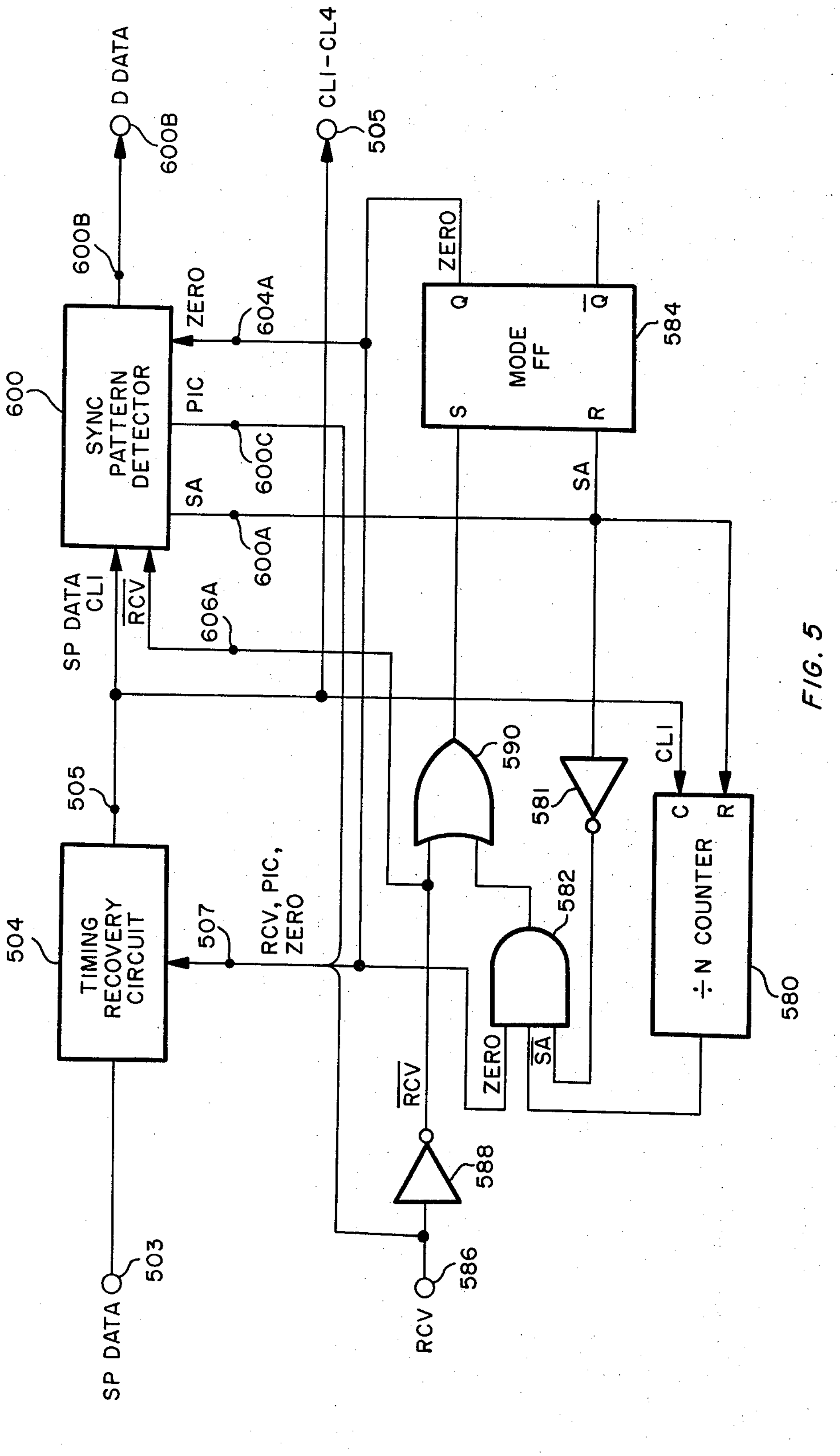
FIG. 5 is a functional block diagram of an embodiment of a timing synchronizing system in accordance with the present invention suitable for more general data transmission systems.

A more generalized circuit for providing a synchronized local clock signal in response to a received data signal is illustrated in FIG. 5.

Referring now to FIG. 5 wherein like numerical designations have been utilized to indicate previously described elements, the received data signal SPDATA may be applied via the input terminal 503 to the timing recovery circuit 504 previously described in connection with FIG. 4. The SPDATA signal and the CL1 signal from the collective output terminal 505 of the timing recovery circuit 504 may be applied to a sync pattern detector 600 and the output signals CL1–CL4 from the timing recovery circuit 504 may be provided at an output terminal 505 for subsequent use in evaluating the received data signal. The CL1 signal from the output terminal 505 of the timing recovery circuit 504 may also be applied to the clock input terminal C of a suitable conventional divide-by-N counter 580 and the output signal from the counter 580 may be applied to one input terminal of a three input terminal AND gate 582.

The sync acquisition or SA signal from the output terminal 600A of the sync pattern detector 600 may be applied to the reset input terminal R of the counter 580, through inverter 581 to a second input terminal of the AND gate 582 and to the reset input terminal R of a suitable conventional monostable multivibrator or flip-flop 584, hereinafter referred to as the mode flip-flop. The sync acquisition complement or P1C signal from the sync pattern detector 600 may be applied via the output terminal 600C to the collective input terminal 507 of the timing recovery circuit 504 and the digital data signal or DDATA signal from the sync pattern detector 600 may be provided at an output terminal 600B for subsequent evaluation.

The RCV signal indicating whether or not the receiver is energized or deenergized may be applied via input terminal 586 to the collective input terminal 507 of the timing recovery circuit 504 and through an inverter 588 to one input terminal of a two input terminal OR gate 590 and to the input terminal 606A of the sync pattern detector 600.

The output signal from the AND gate 582 may be applied to the other input terminal of the OR gate 590 and the output signal from the OR gate 590 may be applied to the set input terminal S of the mode flip-flop 584. The output signal ZERO from the true or Q output terminal of the mode flip-flop 584 may be applied to an input terminal 604A of the sync pattern detector 600, to the collective input terminal 507 of the timing recovery circuit 504 and to the third input terminal of the AND gate 582.

In operation, the received SPDATA signal is applied to the timing recovery circuit 504 and is utilized, as was previously described in connection with FIG. 4, to synchronize the generated clock signals CL1–CL14 in phase and repetition rate to the received data signal. The mode flip-flop 584 is initially set prior to the energization of the data receiver by the high signal level $\overline{RCV}$ signal. Thus, the ZERO signal from the true output terminal of the mode flip-flop 584 is initially at a high signal level.

When the receiver is turned on, the $\overline{RCV}$ signal applied to the set input terminal S of the mode flip-flop 584 assumes a low signal level permitting the mode flip-flop to thereafter be reset. However, until the mode flip-flop is reset, the ZERO signal applied to the timing recovery circuit 504 enables the analog switch 528 in the timing recovery circuit as was previously described in connection with FIG. 4, placing the timing recovery circuit in acquisition mode. While in acquisition mode, the relatively short RC time constant ensures a rapid response rate of the timing recovery circuit thereby providing for extremely rapid synchronization of the VCO 536 at a desired multiple of the bit rate of the incoming data signal. Because of the high response rate of the timing recovery circuit 504 when placed in the acquisition mode, the clock signals may be synchronized to the incoming SPDATA signal within two or three cycles of the received signal, i.e., upon receipt of the 2 or 3 bits. However, the timing recovery circuit may be highly unstable in the acquisition mode and may therefore react adversely to errors such as missing pulses and noise in the incoming data stream.

To provide the required stability after initial synchronization, a predetermined synchronization signal, e.g., the four bit SA synchronization signal illustrated in FIG. 2, may be detected in the incoming SPDATA signal by the sync pattern detector 600. When the first occurrence of the SA signal is detected, the mode flip-flop 584 and the divide-by-N counter 580 are both reset and the ZERO signal assumes a low signal level placing the timing recovery circuit 504 in a less sensitive maintenance mode, i.e., a mode having a lower response rate. In this maintenance mode, the timing recovery circuit 504 is much more stable than in the acquisition mode since it reacts more slowly to errors in the incoming data stream. Thus, the initial synchronization of the clock signals to the incoming data signal is maintained as long as data having a tolerable error rate is thereafter received.

The divide-by-N counter 580 may, however, if it reaches a count of N, place the system back in acquisition mode. For example, if successive sync signals SA are separated by 32 bits as in the preferred data format of FIG. 2, the divide-by-N counter 580 will set the mode flip-flop 584 if the sync pattern SA is not detected 36 counts after the counter 580 is reset by the initial detection of the SA sync pattern. Thus, if the SA sync signal is not detected at its proper location in the data signal after the timing recovery circuit 504 has been placed in maintenance mode, the mode flip-flop is set and the timing recovery circuit reverts back to the acquisition mode.

Of course, the mode flip-flop 584 is also set when the receiver is turned off. However, the RCV signal inhibits the return of the timing recovery circuit 504 to the acquisition mode while the receiver is deenergized as was previously described in connection with FIG. 4. Thus, when the receiver is again energized, the timing recovery circuit is at least very nearly synchronized in repetition rate to the incoming data signal.

Since there is always a possibility that the clock signals generated by the timing recovery circuit 504 may be 180° out of phase with the incoming data signal, the complement of the sync signal SA is also detected by the sync pattern detector 600 and the P1C signal is generated in response to the detection of this complementary signal. The P1C signal is applied to the timing recovery circuit 504 and, as was previously described in connection with FIG. 4, inverts the phase of the clock signal to eliminate the 180° out-of-phase condition.

Sync Pattern Detector

The sync pattern detector 600 of FIG. 5 is illustrated in greater detail in the functional block diagram of FIG. 6. With reference to FIG. 6, the split phase data signal SPDATA from the collective output terminal 505 of the timing recovery circuit 504 of FIG. 4 may be applied through one or more shaping amplifiers 622 to the data input terminal of a four bit shift register 624. The CL1 clock signal from the collective input terminal 505 of the timing recovery circuit 504 of FIG. 4 may also be applied to the clock input terminal C of the shift register 624. The $\overline{RCV}$ signal from the inverter 588 of FIG. 5 may be applied to the reset input terminal R of the shift register 624.

Assuming that the 4 bit sync acquisition pattern SA is 1101, the Q1, Q2 and Q4 output signals from the true output terminals of the first, second and fourth stages of the shift register 624 may be applied to 3 input terminals of a 4 input terminal AND gate 626 and the $\overline{Q3}$ output signal from the false output terminal of the third stage of the shift register 624 may be applied to the fourth input terminal of the AND gate 626. The "pattern recognized" or P1 output signal from the AND gate 626 may be applied to one input terminal of a two input terminal OR gate 628 and the sync acquisition pattern detected" or SA output signal from the OR gate 628 may be provided at an output terminal 600A of the sync pattern detector 600 for application to the mode flip-flop 584 and the divide-by-N counter 580 and the inverter 581.

The $\overline{Q1}$, $\overline{Q2}$, and $\overline{Q4}$ signals from the false output terminals first, second and fourth stages, respectively, of the shift register 624 may be applied to three input terminals of a four input terminal AND gate 630 and the Q3 signal from the true output terminal of the third stage of the shift register 624 may be applied to the fourth input terminal of the AND gate 630. The "sync pattern complement detected" or P1C output signal from the AND gate 630 may be applied to 1 input terminal of a 2 input terminal AND gate 632 and to the output terminal 600C of the sync pattern detector 600. The ZERO signal from the true output terminal 604A of the mode flip-flop 584 may be applied to the other input terminal of the AND gate 632 and the output signal from the AND gate 632 may be applied to the other input terminal of the OR gate 628.

In operation and with continued reference to FIG. 6, the $\overline{RCV}$ signal resets the shift register 624 when the receiver is first turned off. The SPDATA signal is shaped by the shaping amplifiers 622 and is clocked into the shift register 624 by the CL1 clock signal.

When the four bit sync acquisition pattern SA is recognized by the AND gate 626, the SA signal assumes a high signal level for the duration of from one CL1 clock pulse to the next CL1 clock pulse. If the mode flip-flop 584 of FIG. 5 is set or, in the alternative embodiment, if the count in the up/down counter 604 of FIG. 5 is zero, and the complement of the four bit sync acquisition pattern SA is recognized by the AND gate 630, the SA output signal assumes a high signal level and the P1C signal assumes a high signal level changing the phase of the CL1 clock signal as was previously described. When either the sync acquisition pattern or its complement is recognized by the AND gate 626 and 630, the high level SA output signal increments the mode flip-flop 584 of FIG. 5 causing the ZERO signal to assume a low signal level. Thereafter, the AND gate 632 is inhibited and only the successful recognition of the sync acquisition pattern SA by the AND gate 626 will provide a high signal level SA output signal to insure that the mode flip-flop 584 of FIG. 5 remains set.

In addition, the output signal Q1 from the true output terminal of the first stage of the shift register 624 is provided at the output terminal 600B as the DDATA output signal. This DDATA signal may then be utilized by the data evaluator, e.g., the address evaluator in the receiver of the referenced Wigner et al. application, in conjunction with the generated clock signals to evaluate the received message.

While the 180° phase ambiguity may be resolved and corrected by the timing recovery circuit 504 as described in connection with FIGS. 4 and 5 by changing the phase of the clock signals by 180°, this phase ambiguity may also be corrected by changing the phase of the data signal instead of that of the clock signal. For example, as illustrated in FIG. 7, when the sync pattern detector 600 of FIGS. 5 and 6 detects the actual sync pattern, the P1 signal assumes a high signal level. On the other hand, if the complement of the sync acquisition signal is detected by the sync pattern detector 600, the P1C signal assumes a high signal level.

As is illustrated in FIG. 7, the P1C signal may be applied to the set input terminal S of a binary multivibrator or flip-flop 700 and the P1 signal may be applied to the reset input terminal R of the flip-flop 700. The signal from the true output terminal Q of the flip-flop 700 may be applied to one input terminal of a two input terminal AND gate 702 and the output signal from the false output terminal $\overline{Q}$ of the flip-flop 700 may be applied to one input terminal of a two input terminal AND gate 704. The data signal DDATA may be applied to the other input terminal of each of the AND gates 702 and 704 and the output signal from the AND gate 702 may be applied through an inverter 706 to one input terminal of a two input terminal OR gate 708. The output signal from the AND gate 704 may be applied to the other input terminal of the OR gate 708 and the output signal from the AND gate 708, i.e., the DDATA signal, may be provided at an output terminal 710 for subsequent evaluation.

In operation, when the synchronization signal, e.g., SA, is detected, the P1 signal assumes a high signal level and the flip-flop 700 is reset. Thus, the AND gate 704 is enabled and the AND gate 702 is inhibited. The DDATA signal is thus coupled to the output terminal 710 through the enabled AND gate 704 and the OR gate 708 without being inverted.

However, when the complement of the synchronization signal is detected, the P1C signal assumes a high signal level setting the flip-flop 700 and in turn enabling the AND gate 702 and inhibiting the AND gate 704. Thus, the DDATA signal is coupled to the output terminal 710 through the enabled AND gate 702, the inverter 706 and the OR gate 708 thereby providing an inverted DDATA signal at the output terminal 710. While the DDATA signal is inverted in this latter situation, the clock signal is also inverted with respect to the received DDATA signal and thus when the inverted DDATA signal is evaluated utilizing the clock signal, a correct evaluation results.

To accommodate a desired error tolerance in a particular data receiver with which the present invention is utilized, it may be desirable to make the timing recovery circuit of the present invention unresponsive to errors in the incoming data signal below a certain number of rate. For example, an up/down counter described in the referenced Wigner et al. application may be utilized in this connection. Since the timing recovery circuit previously described in connection with FIGS. 4 and 5 is sufficiently stable in the maintenance mode to accommodate such errors in the data stream, the use of an up/down counter which retains the timing recovery circuit in the maintenance mode unless more than a predetermined number of errors are detected in the data stream or unless the rate of detected errors exceeds a predetermined rate may be implemented as described in the referenced Wigner et al. application.

For example, where the data format illustrated in FIG. 2 is utilized, the SA sync signal may be detected as previously described and applied to one input terminal of a two input terminal OR gate 712. The 32 "zero" portion of the data signal or any other suitable portion thereof may be applied to the other input terminal of the OR gate 712 and the output signal from the OR gate 712 may be applied to the UP input terminal of a suitable conventional up/down counter 714.

The complement of the detected sync acquisition signal $\overline{SA}$ and the complement of the detected 32 "o"s signal may be applied respectively to the two input terminals of a two input terminal OR gate 716, the output signal from which may be applied to the DOWN input terminal of the up/down counter 714. The ZERO signal from the up/down counter 714 may be provided at an output terminal 718 and the $\overline{\text{ZERO}}$ signal from the up/down counter 714 may be provided at an output terminal 720.

In operation, when the SA signal assumes a high signal level indicating that the sync acquisition signal SA has been detected, the up/down counter is incremented by a count of one. In addition, when following the data format previously described in connection with FIG. 2, the 32 zeros between successive SA sync signals may be counted and each time 32 zeros are successfully counted, the 32 "O"s signal assumes a high signal level also incrementing the up/down counter. In this manner, the up/down counter may be incremented to some predetermined count, e.g., the count of 3, at which time the counter may be prevented from being further incremented.

Assuming that the up/down counter reaches a count of 3, three successive errors in the SA and zeros portions of the data signal must be detected to decrement the up/down counter through the application of the $\overline{SA}$ and $\overline{\text{32 "O"s}}$ signals to the DOWN input terminal thereof, to zero. Thus, the ZERO and $\overline{\text{ZERO}}$ output signals from the up/down counter may be utilized, in lieu of the mode flip-flop 584 of FIG. 5, to select between the acquisition and maintenance modes of the timing recovery circuit.

SUMMARY OF ADVANTAGES AND SCOPE OF THE INVENTION

It is apparent from the preceding description that the present invention provides numerous advantages with respect to prior art clock generating and synchronizing systems utilized in data transmission systems.

For example, the locally generated clock signal may be rapidly synchronized to the incoming data signal in both frequency and phase and thereafter retained in synchronism with a high degree of stability. During initial synchronization, the system of the present invention provides a synchronization response rate which permits synchronization to be achieved at a 3*db* IF signal-to-noise ratio upon receipt of 2 bits of the data signal. Once synchronization has been acquired, the response rate of the system of the present invention is substantially decreased so that synchronization is maintained with high stability.

Because of the rapid initial synchronization, only a small portion of the incoming data stream is required for synchronization purposes resulting in more efficient use of the data transmission period. Moreover, this rapid synchronization of the clock signal to the incoming data stream permits intermittent operation of the data receiver without adverse effects on the data transmission rate and the accuracy of the data receiver. For example, when utilized in connection with the receiver of the referenced Wigner et al. application, the probability of obtaining synchronization within a full second of data, i. e., one major data frame, with a bit error rate of 0.01 is 0.942 as against a false synchronization probability of $10^{-26}$. At a bit error rate of 0.001, the sync-/false sync probability figures are 0.9995 to $10^{-23}$.

In addition to the rapid synchronization and high noise immunity provided by the present invention, the synchronization system can tolerate errors in the data stream and can also maintain accurate timing during long signal outages. Moreover, a 180° phase ambiguity which may exist between the incoming data stream and the locally generated clock signal may be rapidly resolved and a 180° out-of-phase condition almost instantaneously eliminated by the system of the present invention.

The ability to rapidly resolve phase ambiguity and to correct for a 180° out-of-phase condition serves not only to make possible the use of data at twice the modulation bit rate whereby fast acquisition is achieved, but also the implementation of mode switching whereby the VCO and phase locked loop may be switched into a sync maintenance mode having high stability. The rapid resolution of phase ambiguity also facilitates the correct recognition of a sync word in a digital data signal despite a phase displacement relative to the reference clock.

Should synchronization be lost during a data transmission cycle, the entire cycle is not necessarily lost since the synchronization circuit of the present invention reverts to the rapid acquisition mode when such loss occurs and thereafter rapidly reacquires synchronization and again reverts to the high stability maintenance mode.

In addition to these and other advantages, the circuit of the present invention consumes very little power and the physical size of the circuit makes it particularly advantageous when utilized in conjunction with a paging receiver of the type disclosed in the referenced Wigner et al. application. The present invention, however, has numerous other applications in data transmission and control of remote apparatus. The present invention may thus be embodied in other specific forms without departing from the spirit and essential characteristics thereof. The presently disclosed exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for recovering timing information from a digital data modulated signal comprising:

means for receiving a digital split phase data modulation signal;

means operably connected to said receiving means for recovering the digital split phase data modulation signal;

means responsive to said recovering means for detecting the transitions of the modulation signal and generating a transition signal having a repetition rate related thereto at a repetition rate approximately twice the bit rate of the modulation signal;

means for generating a local signal having a repetition rate variable through a range of repetition rates including a repetition rate related to the repetition rate of the transition signal;

means operably connected to said detecting means and to said generating means for comparing the phase of the transition signal with the phase of the local signal;

means for generating a control signal responsively to said comparing means; and, means responsive to the recovered split phase data modulation and said local signal for detecting a predetermined digital code in the recovered split phase data modulation, the repetition rate of said local signal being varied in response to said control signal at a first rate prior to detection of said predetermined digital code and at a second rate lower than the said first rate subsequent to detection of said predetermined digital code.

2. The apparatus of claim 1 wherein said local signal generating means includes:

means for generating a first signal having a repetition rate variable through a range of repetition rates including a multiple of the repetition rate of the transition signal; and, means for dividing the repetition rate of said first signal by said multiple to thereby generate said local signal.

3. The apparatus of claim 2 wherein said local signal generating means includes means for dividing the repetition rate of said local signal in half to thereby generate a clock signal having a repetition rate approximately equal to the bit rate of said modulation signal and having one of two predetermined phase relationships relative to said modulation signal.

4. The apparatus of claim 1 including:

means for decoding a portion of said modulated signal responsively to said clock signal; and, means responsive to the decoded portion of said modulated signal for determining which of said two predetermined phase relationships exists between said clock signal and said modulation signal.

5. The apparatus of claim 1 including means for storing said control signal to provide control of the repetition rate of said local signal in the absence of a recovered modulation signal.

6. A method for recovering timing information from a digital data modulated signal comprising the steps of:

a. recovering a digital data signal from a digital data modulated signal;

b. detecting the transitions of the digital data signal;

c. generating a transition signal having a repetition rate related to the transition signal;

d. generating a local signal having a repetition rate variable through a range of repetition rates including a repetition rate related to the repetition rate of the transition signal;

e. comparing the phase of the transition signal with the phase of the local signal;

f. generating a control signal responsively to the phase comparison of the transition and local signals;

g. modifying the repetition rate of the local signal in response to the control signal; and, h. detecting a predetermined digital code within the digital data signal, the repetition rate of said local signal being modified in response to said control signal at a first rate prior to detection of said predetermined digital code, and at a second rate lower than the first rate subsequent to detection of said predetermined digital code.

7. The method of claim 6 including the step of generating a clock signal having a repetition rate approximately equal to the bit rate of the digital data signal and having one of two predetermined phase relationships relative to the digital data signal by dividing the repetition rate of the local signal by a factor of two.

8. The method of claim 7 including the steps of:

decoding a portion of the digital data signal responsively to the generated clock signal; and, determining which of the two predetermined phase relationships exists between the clock signal and the digital data signal in response to the digital data signal.

9. The method of claim 8 including the step of storing the control signal to provide control of the repetition rate of the local signal in the absence of a digital data signal.

10. The method of claim 6 wherein the phase of the transition signal is compared with the phase of the local signal by generating a series of pulses having a repetition rate approximately equal to the repetition rate of the transition signal and a duration related to the phase difference between the transition signal and the local signal; and, wherein the control signal is generated by integrating the series of pulses.

11. The method of claim 10 including the steps of modifying the time constant of integration from one predetermined vaule to a higher value in response to a predetermined portion of the digital data signal.

12. Apparatus for synchronizing a locally generated clock signal to a received data signal, the locally generated clock signal having a repetition rate variable through a range of repetition rates including a predetermined repetition rate related to the repetition rate of the data signal, said apparatus comprising:

circuit means operable at first and second response rates for respectively rapidly synchronizing and maintaining the locally generated clock signal at the predetermined repetition rate related to the repetition rate of the data signal at a predetermined phase relationship relative thereto;

means for detecting a predetermined synchronization signal in the data signal; and, means responsive to said detecting means for switching the response rate of said circuit means from said first to said second response rate.

13. The apparatus of claim 12 wherein the clock signal has one of two predetermined phase relationships relative to said data signal and further including:

means for detecting the complement of said synchronization signal; and, means for selecting one of said two predetermined phase relationships responsively to the detection of said predetermined synchronization signal and its complement.

14. Apparatus for synchronizing a locally generated clock signal to a received data signal comprising:

means for detecting transitions in signal level of the data signal and generating a transition signal related in repetition rate to the repetition rate of the data signal;

means for modifying the repetition rate of the locally generated clock signal responsively to said transition signal;

means for detecting a predetermined synchronization pattern and the complement thereof in the data signal; and, means for controlling the phase of the locally generated clock signal responsively to one of the detected synchronization patterns and its complement.

15. The apparatus of claim 14 wherein said modifying means includes means for generating a control signal related in amplitude to the repetition rate of said transition signal, and wherein said modifying means is responsive to said control signal.

16. The apparatus of claim 15 including means for storing said control signal to provide control of said modifying means during the absence of said data signal.

17. Apparatus for synchronizing a locally generated clock signal to a received data signal comprising:

circuit means operable at first and second response rates for respectively rapidly establishing and maintaining a predetermined repetition rate and phase relationship between the locally generated clock signal and the received data signal;

means for detecting a predetermined synchronization signal in the received data signal; and, means for modifying the response rate of said circuit means from said first response rate to said second response rate in response to the detection of said predetermined synchronization signal, the first rate being substantially higher than the second rate whereby after the predetermined relationship is rapidly established and said synchronization signal is detected, the predetermined relationship is maintained with a high degree of stability and is relatively unaffected by tolerable errors in the data signal.

18. A method of synchronizing a locally generated clock signal to a data signal received from a remote location comprising the steps of:

a. generating a clock signal;

b. modifying the frequency of the generated clock signal at a first rate of change until synchronization of the clock to the data signal within predetermined limits is obtained for rapid acquisition of synchronization; and, c. thereafter modifying the frequency of the generated clock signal at a second rate of change less than the first rate of change for stable maintenance of synchronization.

19. The method of claim 18 including the further steps of:

d. determining the phase relationship of the clock signal relative to the data signal; and, e. effecting a predetermined phase relationship between the clock signal and the data signal.

20. The method of claim 12 including the steps of detecting a predetermined bit pattern in the data signal; and, modifying the rate of change of clock frequency modification responsively thereto.

21. A method of synchronizing a locally generated clock signal to a data signal received from a remote location comprising the steps of:

a. detecting transitions in the signal level of the data signal;

b. generating a clock signal;

c. modifying the frequency of the clock signal responsively to the frequency of transitions detected;

d. detecting a predetermined bit pattern in the data signal;

e. changing the rate of clock signal frequency modification responsively to the detection of the predetermined bit pattern.

* * * * *